US006091068A

United States Patent [19]

Parfitt et al.

[11] Patent Number: 6,091,068

[45] Date of Patent: Jul. 18, 2000

[54] ION COLLECTOR ASSEMBLY

[75] Inventors: William E. Parfitt, Camillus; Timothy L. Karandy, East Syracuse; Louis C. Frees; Robert E. Ellefson, both of Manlius, all of N.Y.

[73] Assignee: Leybold Inficon, Inc., East Syracuse, N.Y.

[21] Appl. No.: 09/072,034

[22] Filed: May 4, 1998

[51] Int. Cl.[7] .............................. B01D 59/44; H01J 49/00

[52] U.S. Cl. ........................... 250/292; 250/283; 250/281

[58] Field of Search ..................................... 250/281, 282, 250/283, 292

[56] References Cited

U.S. PATENT DOCUMENTS

| | | | |
|---|---|---|---|
| Re. 33,344 | 9/1990 | Stafford . | |
| 4,227,087 | 10/1980 | Kurz . | |
| 4,230,943 | 10/1980 | Franzen et al. . | |
| 4,234,791 | 11/1980 | Enke et al. | 250/296 |
| 4,267,448 | 5/1981 | Feser et al. . | |
| 4,633,084 | 12/1986 | Gruen et al. . | |
| 4,731,538 | 3/1988 | Gray . | |
| 5,107,109 | 4/1992 | Stafford, Jr. et al. . | |
| 5,202,562 | 4/1993 | Koga et al. | 250/282 |
| 5,204,530 | 4/1993 | Chastagner . | |
| 5,223,711 | 6/1993 | Sanderson et al. | 250/283 |
| 5,426,299 | 6/1995 | Nakagawa et al. | 250/283 |
| 5,561,292 | 10/1996 | Buckley et al. . | |
| 5,640,011 | 6/1997 | Wells . | |
| 5,808,308 | 9/1998 | Holkerboer | 250/283 |
| 5,834,770 | 11/1998 | Holkerboer et al. | 250/283 |
| 5,866,901 | 2/1999 | Penn et al. | 250/283 |

*Primary Examiner*—Bruce C. Anderson
*Attorney, Agent, or Firm*—Wall Marjama Bilinski & Burr

[57] ABSTRACT

An ion collector includes a Faraday collector having a conductive surface disposed substantially parallel to and spaced from the axis of an entering particle beam containing charged and uncharged particles. A grounded plate disposed in the path of the particle beam allows incoming uncharged particles to impinge thereupon. Preferably, the application of a suitable potential to the conductive plate manipulates incoming charged ions to impinge upon either the electron multiplier or the Faraday collector. The ion collector can further include an electron multiplier used in conjunction with the Faraday collector to allow separate modes of operation. Application of a suitable first potential to the electron multiplier can cause charged particles to be deflected directly to the Faraday collector in one mode, and application of a second potential can cause deflection of charged particles to the electron multiplier, with the effects of the uncharged particles on the output of the detector being minimized.

11 Claims, 6 Drawing Sheets

ION COLLECTOR ASSEMBLY

CROSS REFERENCE TO RELATED APPLICATIONS

This application is based upon U.S. Provisional Application, U.S. Ser. No. 60/072,122, filed Jan. 22, 1998 in the names of William E. Parfitt, Timothy L. Karandy, Louis C. Frees, and Robert E. Ellefson, and U.S. Provisional Application, U.S. Ser. No. 60/083,918 filed May 1, 1998 in the names of William E. Parfitt, Timothy L. Karandy, Louis C. Frees, and Robert E. Ellefson.

FIELD OF THE INVENTION

The invention relates to the field of mass spectrometers, such as those used for the analysis of gases in vacuum process equipment, and more specifically to an ion collector used in the quantitative and quantitative measurement of said gases.

BACKGROUND OF THE INVENTION

When carrying out manufacturing processes in vacuum environments, it is frequently useful or necessary to employ a small or "miniature" mass spectrometer to indicate the gas species present in the rarified atmosphere within a process zone. A miniature mass spectrometer is able to operate at higher absolute pressures (i.e., not as much vacuum) than a conventionally sized spectrometer, thereby being useful for monitoring some processes, such as sputter deposition of thin films, which cannot be monitored by conventional equipment. Such a mass spectrometer is commonly attached directly to the pressure vessel and operates in the vacuum which is generated by the process system. Mass spectrometers designed for this purpose frequently include a secondary sensing apparatus for indicating the operating vacuum level, such as a total pressure collector or a vacuum gauge, in addition to the primary sensing apparatus for indicating the partial pressure of interest.

Referring to FIGS. 1 and 2, a mass spectrometer 10 of this type includes a dual ion source 16 in which a total pressure (ion) collector 22 and an ion analyzer 18 are oppositely disposed relative to a common ionization volume 26 in which the ions are generated. The ions are generated by heating of respective filaments 24, the ionization volume 26 being operated at a positive potential by biasing an electrode, such as an anode 36, typically in the 80 to 200 volt range with respect to ground, so that positive ions are attracted to the total pressure (ion) collector 22 and the ion analyzer 18. Focus lenses or plates 25, 27 having an opposite negative potential are used to accelerate the ions into movement to the ion analyzer 18 and the total pressure (ion) collector 22, respectively.

The total pressure (ion) collector 22 typically consists of an ion collector electrode 37 having a facing collector surface 21, incorporated with the ion source 16, with suitable electronic circuits to amplify and measure the electric current thus collected based on the collection of generated positive ions from the primary ion beam 34. When calibrated with a reference vacuum gauge, the current collected by the total pressure collector 22 can be used to indicate the degree of vacuum available. Ions strike the facing surface 21 of the collector electrode 37 with sufficient energy to cause the emission of significant quantities of electrons, known as secondary electrons. This well known effect is described in publications, such as *Methods of Experimental Physics*, vol. 4, Academic Press (1962), the contents of which are herein incorporated by reference.

In brief, the ion analyzer 18 collects and analyzes a first portion of the produced ions to determine a partial pressure for a selected gas species within a sample gas. As described herein, the ion analyzer 18 is a mass filter, such as a quadrupole mass filter, which separates the ions, allowing only those ions having a predetermined mass to charge ratio to pass therethrough to an ion detector 20. The oppositely disposed ion collector 22 collects a second portion of the produced ions from a secondary ion beam 34 to determine a total pressure of the gas sample. The secondary ion beam 34 is not segregated and is representative of the entire gas sample.

The ion detector 20 includes means for collecting the selected ions passing through the ion analyzer 18. The ions are collected and converted to an electric current which can be externally measured by an arranged amplifier and indicator to indicate the quantity of ions collected.

Ion detectors usually contain a combination of a Faraday collector (hereinafter also referred to as FC) and an electron multiplier (hereinafter also referred to as EM) to allow selective operation based on advantages found in each. As is known, a Faraday Collector is a conductive plate or electrode which is attached to ground potential. Positive ions striking the plate are neutralized and draw current from circuitry attached to the electrode. The current flow resulting is exactly equal to the incident ion current. An electron multiplier includes an element which draws the positive ions based on a negative high voltage bias. When an ion strikes a first surface of the EM, one or more secondary electrons are emitted. These electrons are further accelerated to a second and subsequent surfaces, causing the emission of further electrons, the process repeating itself until a stream or pulse of electrons is created which is directed to an electron collector, such as a Faraday Cup. As such, the output from a Faraday detector is positive, while the output of the EM is negative. The advantage is an increased sensitivity, particularly at lower pressures for EMs as opposed to FCs, more advantageously used at higher pressures, for example. Other reasons and advantages are known for each mode of operation to those of sufficient skill in the field. Therefore, no further discussion is required, except as applicable to the present invention.

The ion collecting surface of the total pressure (ion) collector 22 faces the ionization volume 26. It has previously been determined that some of the emitted secondary electrons can be accelerated back into the ionization volume, a portion of which pass though the mass analyzer because the electrons have sufficient velocity to transit the length of the analyzer during a small period of the analyzer selection cycle when the separating voltage is at or near zero.

The effect of the secondary electrons produces a negative baseline effect on the output of the ion detector. As described in U.S. Pat. No. 5,834,770, herein incorporated by reference in its entirety, an ion collector has been designed which deflects a substantial portion of secondary electrons produced by ion bombardment with the ion collector away from the ionization volume.

It has been further determined, however, that due to the amount of energy of the ions (typically on the order of 80 eV or more) accelerated into collision with the ion collecting electrode 37, that photons or other energetic uncharged particles can also be produced. Photons are also emitted from the ionization volume by gas molecules which are excited by the incident electron beam. Some of the photons shine through the ion analyzer 18 to the ion detector 20. Additionally, ions moving through the ion analyzer 18 can be neutralized and retain kinetic energy. The result of photons or other energetic neutral particles impinging onto the conducting Faraday surface is the creation of additional electric current which can not be discriminated from incident ion current. The effect is pressure dependent; that is, more photons are produced with an increasing number of ions contacting the total pressure collector 22, and uniformly affects the baseline in a positive sense, as shown by comparing the graphical outputs illustrated in FIGS. 3(*a*) and 3(*b*).

FIG. 3(*a*) illustrates a spectrum of mass (amu) versus current taken at a 10 milliTorr for nitrogen using the system illustrated in FIGS. 1 and 2. FIG. 3(*b*) illustrates a similar spectrum taken under the same conditions, but having first removed the total pressure collector 22. The results are fairly pronounced; for example, at mass 21 the baseline current shown in FIG. 3(*b*) is reduced by a factor of 0.001 when the ion collecting electrode 37 is removed.

SUMMARY OF THE INVENTION

There is a need to eliminate the deleterious effect caused by photons or other neutral particles entering the ion detector unaffected by the mass filter.

Therefore, and according to a preferred aspect of the present invention, there is provided an ion collector for a mass spectrometer, said spectrometer including an ion source, an ionization volume into which ions from said ion source are transmitted, a filter adjacent said ionization volume for allowing only ions having a specified mass to charge ratio to pass therethrough, and an ion detector disposed at an exit end of said filter, wherein said detector includes a Faraday collector and an electron multiplier, each being selectively engageable for determining the partial pressures of a gas mixture.

A total pressure collector is disposed across the ionization volume oppositely from the mass filter for determining the total pressure of the gas being ionized. The total pressure collector includes a total pressure collecting surface capable of producing photons or other uncharged particles which may pass into the ionization volume and subsequently the mass filter and ion detector after striking the total pressure plate.

According to the invention, the ion collector includes an electrically grounded beam shield for capturing incoming photons and other energetic neutral particles which may traverse the mass filter structure. The beam shield is disposed in the path of the entering ion beam.

The beam shield is used together with the application of an appropriate deflecting bias or electrical potential on the grid shield at the entrance of the electron multiplier when the detector is used in the Faraday detection mode of operation. According to the invention, the electron multiplier mode of operation is not affected.

A primary advantage realized by the present invention is an improvement in the performance characteristics of the mass spectrometer due to the removal of a pressure dependent offset found in the recorded ion current versus mass. Therefore, the resulting mass resolved ion current measured in the Faraday detection mode is more directly proportional to the abundance of the ion species in the gas being analyzed than when a bias current from photons and/or neutrals is present.

Another advantage realized by the present invention is that the noise level of the electron multiplier mode of operation is lowered because the elimination of the portion of the Faraday plate extending into the path of the incoming ion beam increases the distance between the high voltage on the electron multiplier entrance and the Faraday plate. The increase in distance thereby reduces the capacitive coupling of the AC noise present on the high voltage to the electrometer input.

Yet another advantage realized by the ion detector of the present invention is that a single common electrode can be used for both Faraday and electron multiplier modes of operation in conjunction with a bi-polar electrometer, further simplifying manufacturing as well as cost while providing savings in space allocation.

These and other objects, features, and advantages will now be described in the following Detailed Description of the Invention which should be read with the accompanying drawings.

BRIEF DESCRIPTION OF THE DRAWINGS

FIG. 3(*b*) is the representative graphical output of FIG. 3(*a*) with the total pressure collector removed to illustrate the presence of a pressure dependent offset;

DETAILED DESCRIPTION OF THE INVENTION

Figure 1:
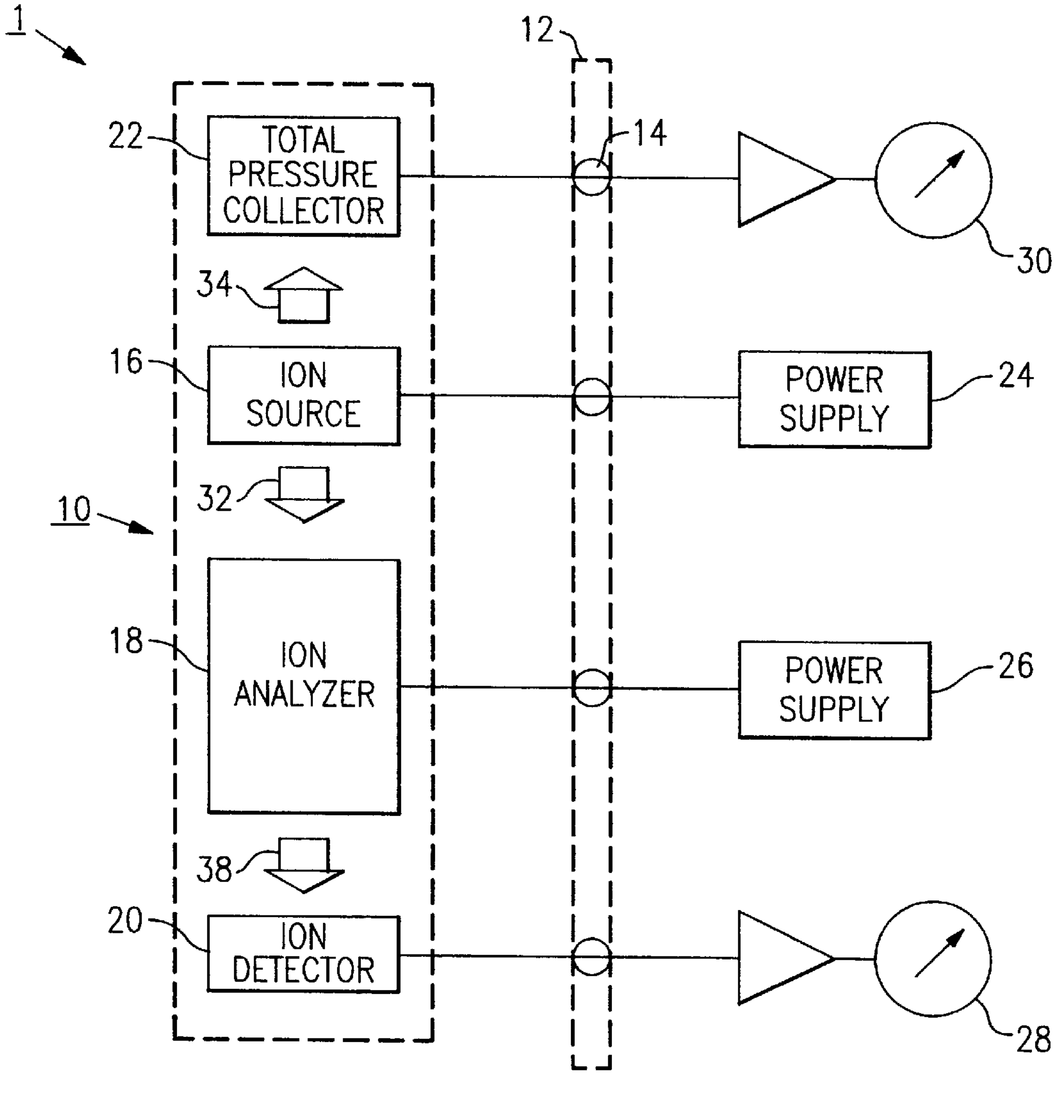
FIG. 1 is a schematic diagram of a known mass spectrometer.

Referring to the drawings, and more specifically to FIG. 1, a block or schematic diagram is illustrated for a gas analysis sensor such as a quadrupole mass spectrometer 1. According to this specific embodiment, the sensor includes a sensor assembly 10 mounted within a housing 12, shown only partially, containing electrically insulated, hermetically sealed connections 14 so that the sensor can be operated in a high vacuum with an external apparatus for providing the necessary power inputs and for measuring the sensor outputs.

The sensor assembly 10 includes an ion source 16, an ion analyzer 18 such as a quadrupole mass filter, an ion detector 20, and a total pressure collector 22. According to this embodiment, the total pressure collector 22 is disposed relative to the ion source 16 with respect to the ion analyzer 18 and the ion detector 20. Separate suitable electrical power supplies 24 and 26 provide necessary voltages and currents for the ion source 16 and the ion analyzer 18, respectively. A suitable amplifier and indicator 28 measures the output of the ion detector 20, while a similar amplifier and indicator 30 measures the output of the total pressure collector 22. The electrical connections shown indicate general functions and may in fact represent a number of electrical conductors between sensor components and their respective external components.

Figure 2:
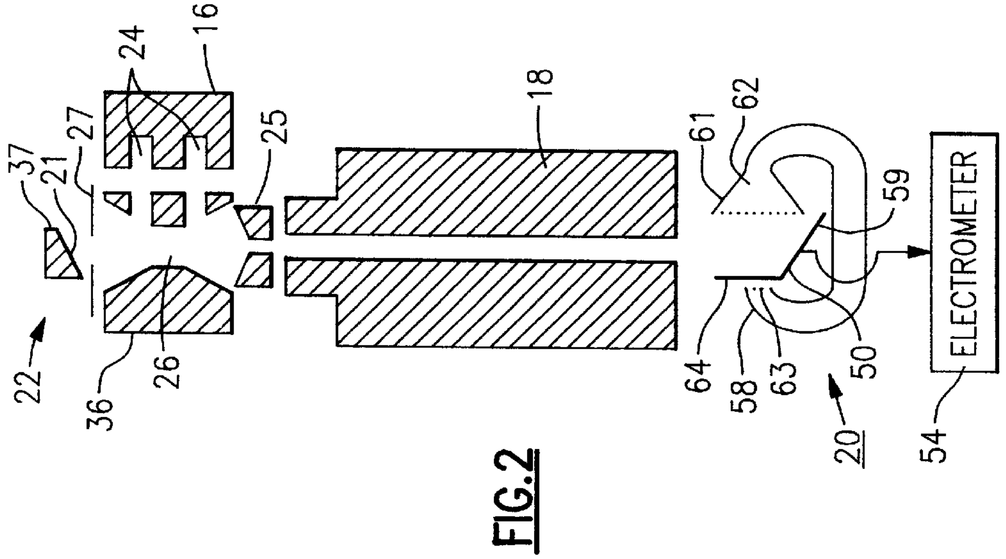
FIG. 2 is a partial sectional view of a quadrupole mass spectrometer using a known ion detector.
Figure 3A:
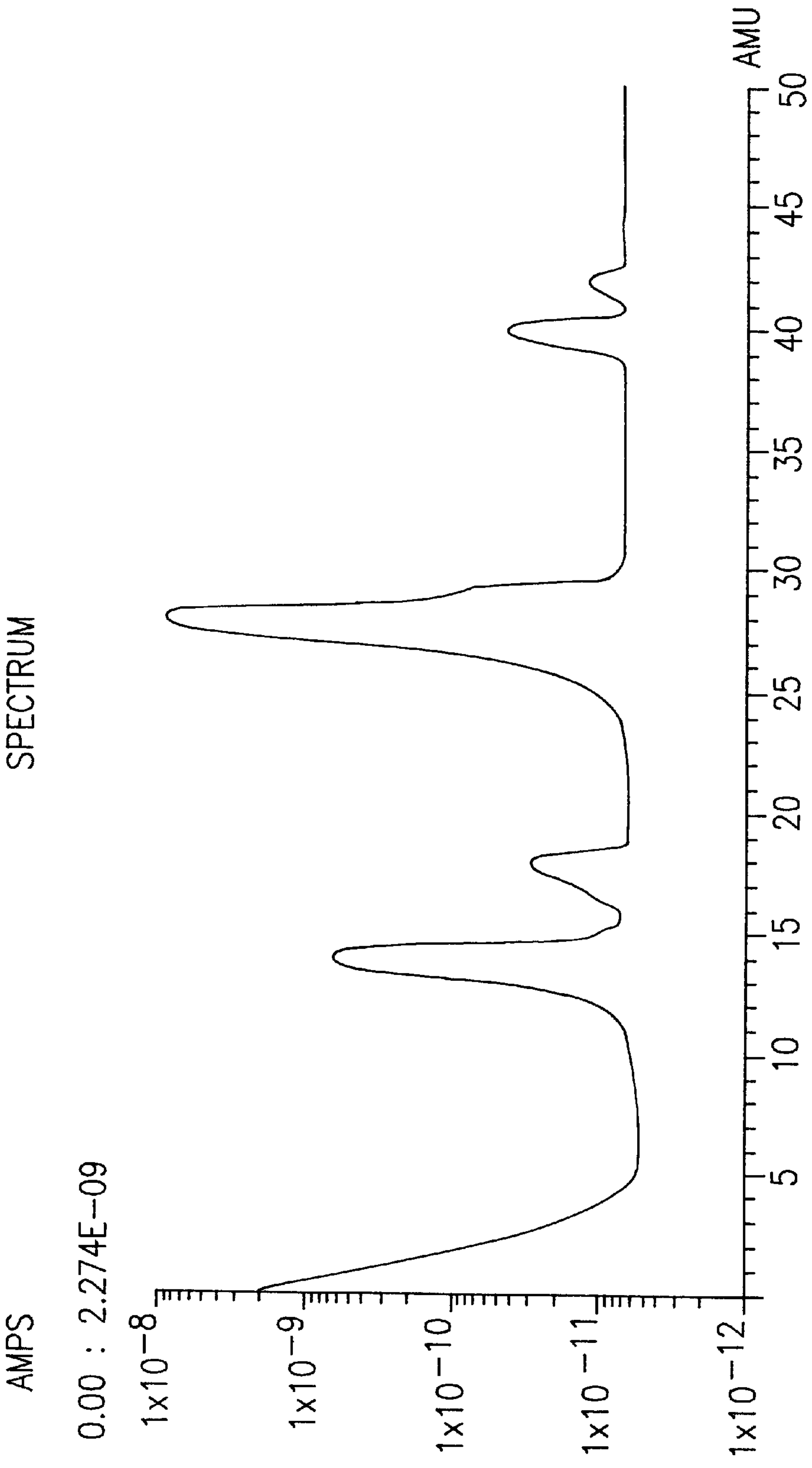
FIG. 3(*a*) is a representative graphical representation of an ion current output using the mass spectrometer of FIG. 2.
Figure 3B:
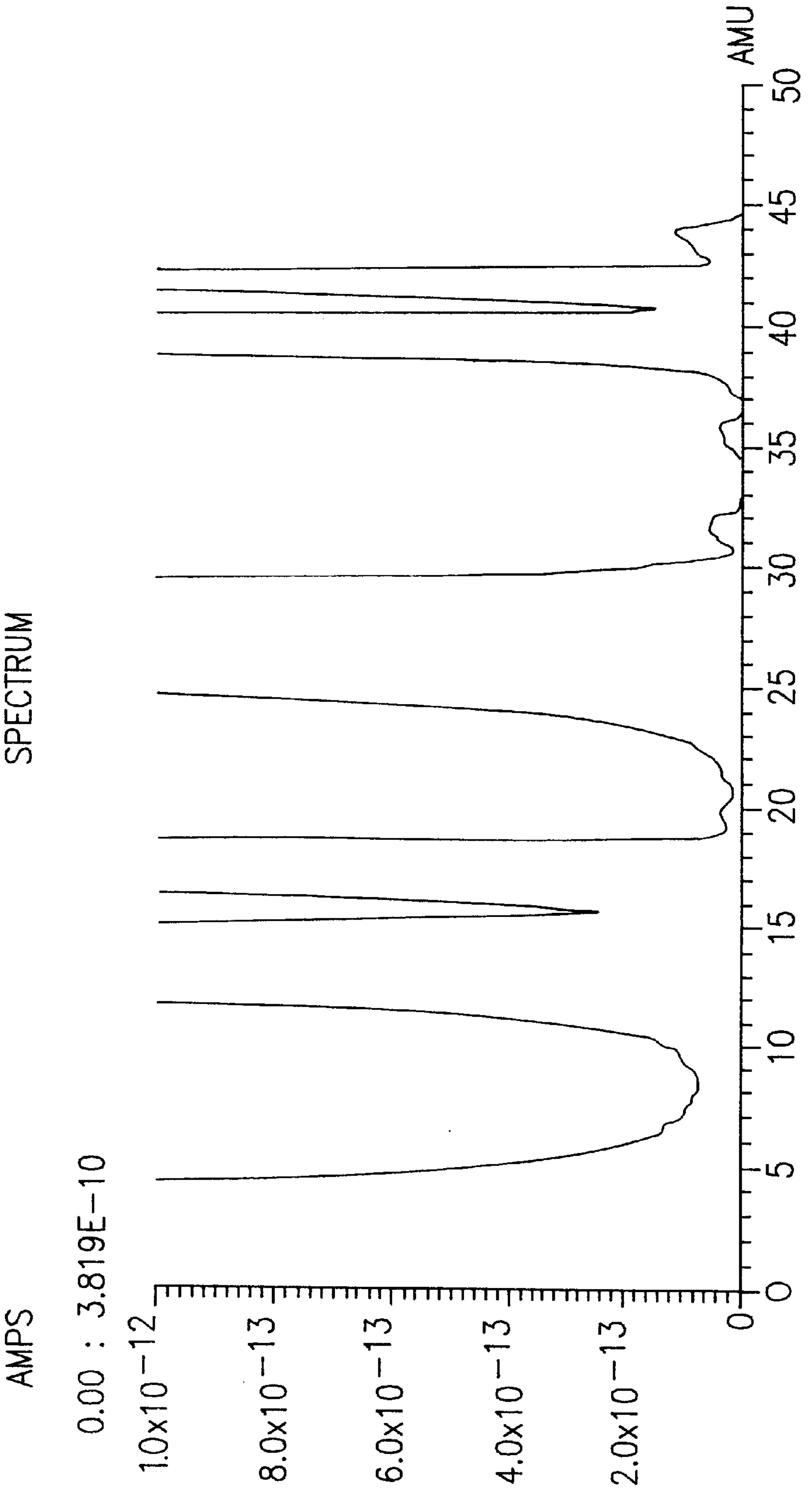

The ion source 16, as illustrated in FIGS. 1 and 2, is referred to throughout the course of discussion as a dual ion source. The dual ion source 16 utilizes a common ionization volume 26, situated between the oppositely disposed ion analyzer 18 and the total pressure (ion) collector 22, from which a primary ion beam 32 is extracted for focusing onto the ion analyzer 18, and a secondary ion beam 34 is similarly extracted and directed to the total pressure collector 22.

The ion analyzer 18 is a quadrupole mass filter which selects ions of a particular species according to mass ie., selected ions 38, for transmission to the ion detector 20 while diverting of rejecting ions of all other masses. Details relating to the theory of operation and other details of quadrupole mass filters are commonly known in the field and therefore require no further discussion herein. The adjacent ion detector 20, described in greater detail below, collects and converts the selected ions 38 to an electric current which can be externally measured by the separate amplifier and indicator to measure the quantity of ions collected.

The oppositely disposed total pressure (ion) collector 22 captures the entirety of the secondary ion beam 34 containing all ion species, regardless of mass, and converts them into electric current. Through calibration with another vacuum gauge, the vacuum level in the defined ionization volume 26 is calculated from the magnitude of the total pressure current. As noted above, a separate amplifier and indicator 30 indicate the quantity of ions collected by the total pressure collector 30.

Figure 4:
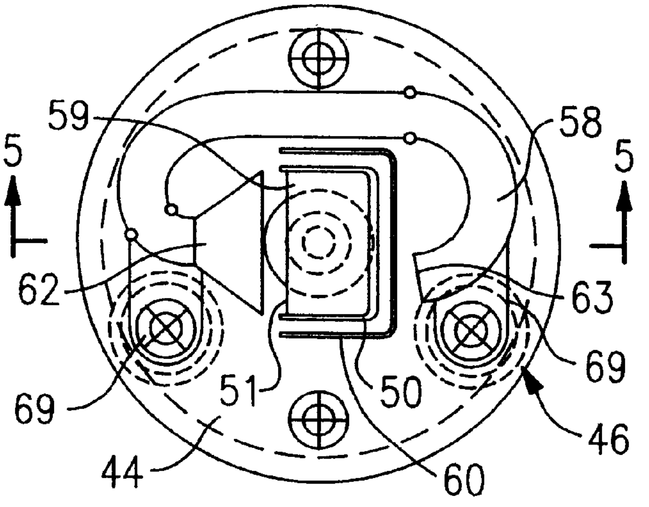
FIG. 4 is a plan view of an ion detector similar to that used in the mass spectrometer of FIG. 2.
Figure 5:
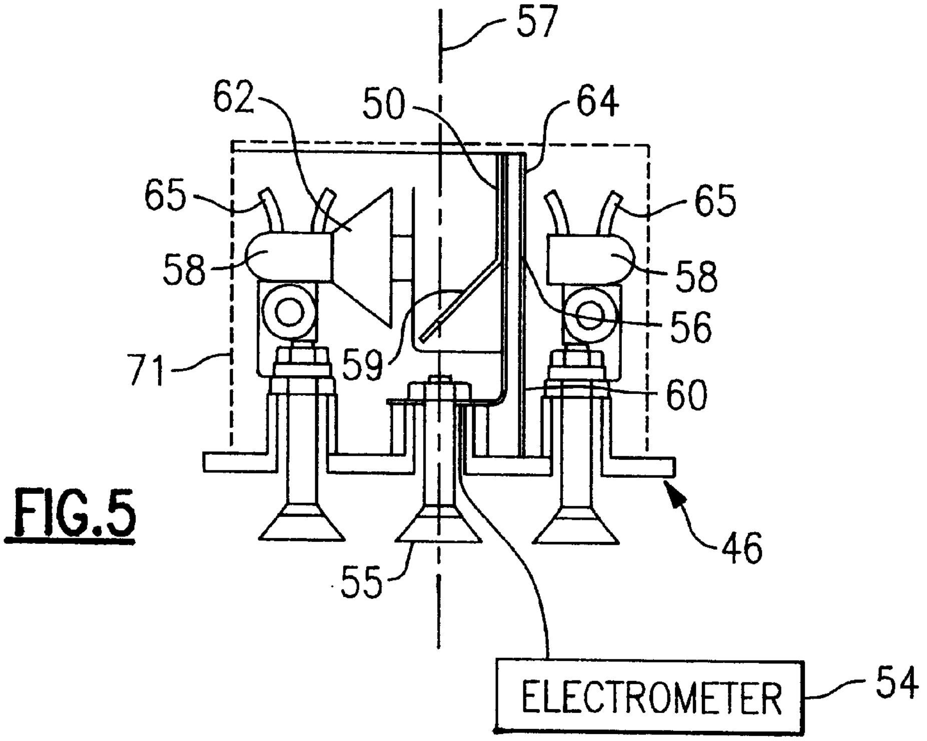
FIG. 5 is a side elevational view of the ion detector of FIG. 4 as taken sectionally through the lines 5—5.

Referring to FIGS. 4 and 5, the ion detector 20 is a combination channel electron multiplier/Faraday cup ion detector, such as the Continuous Dynode Electron Multiplier with Faraday Plate Model 366, manufactured by Detection Technology, Inc. The ion detector 20 includes a base portion 44 connected to a horizontal mounting plate 46, the detector having a center axis 57 which is coaxially aligned with the exit face of the ion analyzer 18, FIG. 1. The description which follows refers to the center axis 57 as being vertical. This description should not be interpreted as limiting, but is intended to provide a suitable frame of reference when comparing to the accompanying drawings.

A Faraday collector (FC) 50 includes a three sided member having an open end 51, the three sides vertically extending in a direction which is parallel to the center axis 57 and spaced therefrom to define an open-ended rectangular enclosure. The FC 50 is mechanically attached by conventional means to the mounting plate 46 and is made from a conductive plate material, such as stainless steel, and attached electrically via a signal lead 53 attached to a mounting screw 55 or other fastener supporting the base portion to the mounting plate, the signal lead extending to an electrometer 54 connecting the FC essentially to ground potential. A beveled plate portion 59 of the Faraday collector 50 extends inwardly from each of the sides thereof and is angled relative to the horizontal axis. In the present embodiment, the plate portion is angled approximately 45 degrees, though this value can be varied. The beveled plate portion 59 is spot-welded or otherwise integrally formed with the remainder of the collector 50.

A tubularly shaped continuous dynode electron multiplier 58 having a thermally conductive interior surface on an insulating substrate, includes a conically shaped entrance opening 62 having a conductive grid shield 61, FIG. 2, which is connected by known means to a power supply (not shown), the conical opening facing the open end 51 of the FC 50. The electron multiplier 58 includes a hollow interior and axially extends in a horizontal plane through a substantially 360 degree circuit, the multiplier having an exit end opening 63 disposed in proximity with a vertically extending grounded shield 60 with an appropriately sized hole 56 for electrons to strike the exterior side of the Faraday collector 50. The multiplier 58 is supported mechanically with clips 65 connected to respective EM voltage sources 69. According to this embodiment, the exit end opening 63 is substantially diametrically opposite from the conical entrance opening 62. Each of the FC 50, the electron multiplier 58 are housed within a cylindrical grounded shield 71, as is known.

Referring to FIGS. 1–5, the operation of the ion detector 20 is as follows: First, and in the FC mode of operation, the FC is connected to the input of the electrometer 54, which is essentially at ground potential. The incoming ion beam enters the ion detector 20 along the center axis 57 and impinges upon the beveled plate 59. The ions are positively charged, as noted above, and are neutralized upon striking the beveled plate 59, drawing current as a signal output to the electrometer 54. The problem, as described above, are that photons and other energetic uncharged particles from the total pressure collector 22, FIG. 1, are also transmitted through the ion analyzer along the direction of travel of the ion beam. The incidence of photons with energy greater than the work product of stainless steel upon the beveled plate 59, or in other known detectors having any portion extending into the path of the ion beam, causes an increase in current due to photoelectric effects. The incidence increases with pressure, making use of the FC mode less effective.

In the alternate or EM (electron multiplier or amplification) mode of operation of the detector 20, a high voltage electrical potential is established (approximately −1000 to −3000 volts, −1150 volts according to this embodiment) at the grid shield 61 adjacent the conical entrance opening 62. This negative potential draws the positive ions from the incoming beam into the interior of the multiplier where secondary electrons are created. A less negative potential (approximately −650 volts according to this embodiment) further accelerates the electrons to the exit end opening 63 where the negative potential repels the electrons through the exit end opening through the hole in the grounded shield and toward the exterior side of the FC 50. Electrons emerging from the opposing exit end opening 63 of the multiplier 58 located substantially diametrically opposite to the conical entrance opening 62 are caused to impinge against the proximate exterior side of the FC 50. Further details relating to the theory of electron amplification are described in greater detail in U.S. Pat. No. 4,227,087, the entire contents of which are incorporated herein by reference.

Referring now to FIGS. 1 and 6–8, a preferred ion detector 20A is now described for use with the foregoing mass spectrometer. For the sake of clarity, similar parts are labeled with the same reference numerals.

Figure 6:
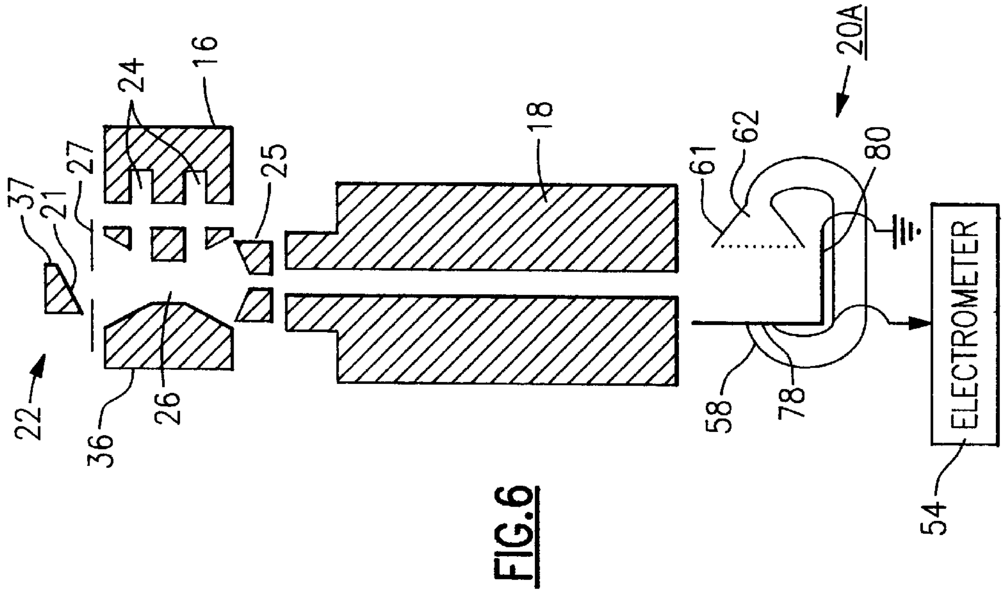
FIG. 6 is the sectional view of the mass spectrometer of FIG. 2, incorporating an ion detector in accordance with a preferred embodiment of the present invention.
Figure 7:
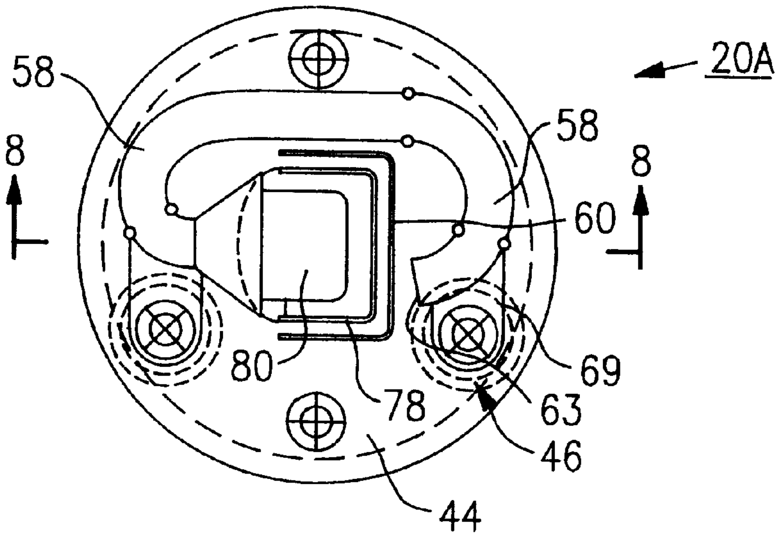
FIG. 7 is a plan view of the ion detector of FIG. 6.
Figure 8:
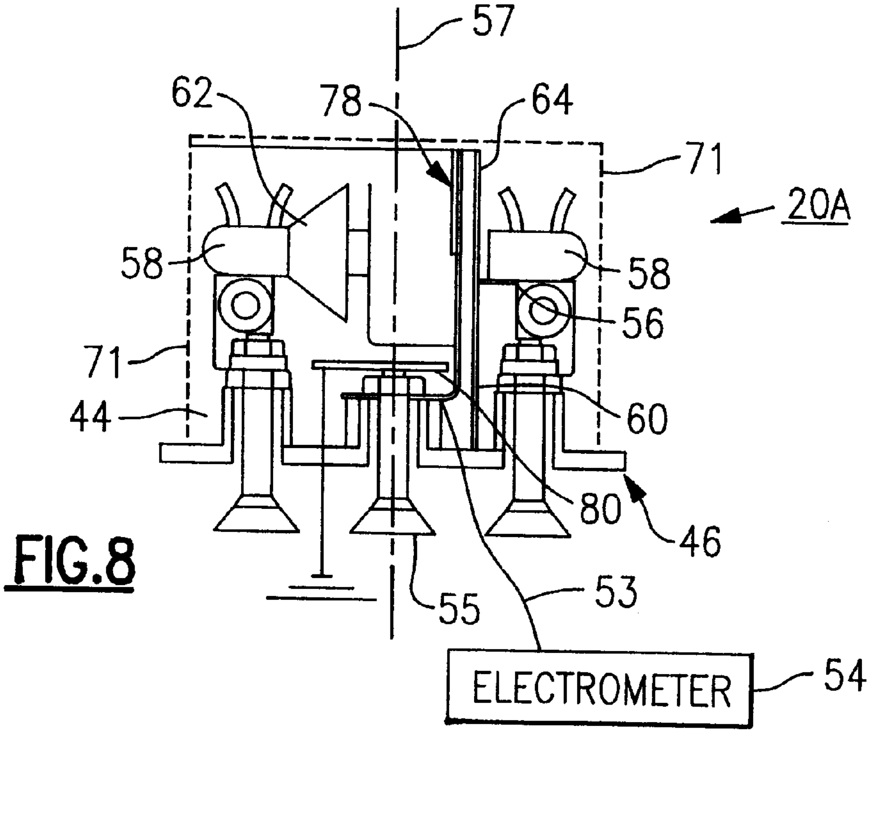
FIG. 8 is a side elevational view of the ion detector of FIG. 6, as taken sectionally through the lines 8—8.

As shown in FIGS. 6–8, a mass spectrometer 1A is shown having an ion source 16, a total pressure ion collector 22 and an ion analyzer 18, such as a quadrupole mass filter, arranged in the manner previously described. In fact, with the exception of the ion detector 20A, the entirety of the system is identical to that described and shown in FIG. 2.

The ion detector 20A includes a base portion 44 attached to a horizontal mounting plate 46, and includes a center axis 57, similarly aligned with the direction of travel of an incoming ion beam. As previously described, the interior of the detector 20A includes a cylindrical grounded shield 71 surrounding the active components of the detector and an interior shield 60 includes a hole 56 through which electrons from the EM impinge onto the exterior side of the FC 78.

The ion detector 20A also includes an electron multiplier 58, preferably made from a dynode material, which is disposed in the manner previously described and having a conical entrance opening 48. The multiplier 58 extends axially in a substantially circular manner and includes an exit end opening 63 diametrically opposite from the conical entrance opening 62 relative to the center axis 57. The plane of the entrance and exit ends 62, 63 are substantially vertical and are spaced from the center axis 57 of the ion detector 20A. A conductive grid shield 61 covers the conical entrance opening 62 and acts an electrode such that a negative high voltage potential can be applied for diverting the positive ions from the incoming ion beam. As in the preceding, the electron multiplier 58 is electrically connected to an electrometer 54. Preferably, the electrometer 54 is of the bi-polar type for reasons detailed below.

The ion detector 20A also includes a Faraday collector (FC) 78 defined by a rectangularly shaped enclosure defined by three orthogonal and vertically extending sides and an open end disposed about the center axis 57 of the ion detector 20A and mounted by conventional means. As opposed to the preceding version, however, no horizontal or beveled plate portion is provided, meaning that no portion of the FC 78 is in the path of the incoming ion beam.

A beam shield 80, made from a suitable conductive material, is attached and connected by known means to ground potential. The beam shield 80 is a flat conductive plate member extending substantially horizontal; that is, substantially parallel to the mounting plate 46, the shield being roughly centered on the center axis 57 of the ion detector 20A and beneath the electron multiplier 58 and the FC 78. In this configuration, the beam shield 80 is aligned with the exit lens (not shown) of the ion analyzer 18.

The method of operation of the ion detector of the present embodiment will now be described. As in the preceding, the ion detector 20A is capable of selective modes of operation, employing either an FC mode or an EM mode. First, and in the FC mode, a positive electrical potential is applied to the grid shield 61 at the conical opening 62 of the electron multiplier 58. It has been determined that a potential of between 50 and 100 volts is suitable. Approximately, 50 volts are applied in the present embodiment. The positive ions passing emerging from the ion analyzer 18 from the ionization volume 26 are deflected due to the applied positive bias of the electric field, thereby repelling the ions to impinge upon the vertically disposed sides of the FC 78. The photons, and any other energetic uncharged particles entering the ion detector 20A, however, are unaffected by the electric field, and therefore impinge directly on the surface of the grounded beam shield 80. Electrons produced due to the photoelectric effect are attracted to the positive deflection voltage applied to the cone of the EM, though their effect on current measured is negligible.

The EM mode of operation of the present ion detector 20A is unchanged. That is, a high voltage negative potential is again established (approximately −1.15 kv) at the entrance grid shield 61 of the electron multiplier 58 causing the incoming beam of positive ions to be deflected by the created electric field to the conical opening 62. The ions are accelerated through the interior of the hollow dynode member, producing electrons through contacting the interior wall of the multiplier 58. The less negative potential at the exit end repels the formed electrons onto the exterior side of the conductive FC 78, which is electrically connected in a known manner to the electrometer 54.

In that a common electrode is used for both FC and EM modes of operation, a single bi-polar electrometer can be utilized. Inversion of the polarity of the negative electron current from the EM detector output is accomplished with a gain of (−1) amplifier stage of the electrometer output to produce a positive ion intensity signal for each detection mode.

In the meantime, any uncharged particles entering the ion detector 20A in this mode are unaffected by the generated electric field, and impinge directly upon the beam shield 80. Any electrons created as a result of the particles striking the surface of the beam shield 80 do not affect the output of current. Therefore, the overall positive baseline effect shown in FIG. 3(*a*) is minimized, improving the output characteristics of the mass spectrometer.

In addition, by removing the portion of the FC extending directly into the path of the incoming ion beam, an increase in distance is realized relative to the electron multiplier 58. This increase in distance produces a further realized benefit the capacitive coupling of the AC noise present on the high voltage to the electrometer input is dramatically reduced. Reductions by a factor of 5–10 can be realized, depending on the individual EMIFC detector unit.

Though the preceding related to a preferred embodiment, it should be apparent that other modifications and/or variations can be realized by one of sufficient skill in the field which embody the concepts taught herein and according to the following claims. For example, the present invention can be utilized for other known ion detectors used in combination with mass spectrometers and having conductive plate portions extending into the path of the incoming ion stream.

It should also be readily apparent that single mode off-axis FC detectors can also be modified in accordance with the teachings of the present invention. Using such an FC detector, a positive potential can be applied to a conductive plate or other shaped collector to deflect the incoming ion beam using a positive potential in the manner described for the EM grid. A grounded beam shield disposed in the path of the ion beam can be used to stop photons and neutral particles. In addition, this potential can be applied, for example, using the power source 24, FIG. 1, used to bias the anode 36, FIGS. 2, 6.

PARTS LIST FOR FIGS. 1–8

1 mass spectrometer
10 sensor assembly
12 housing
14 electrical connections
16 ion source
18 ion analyzer
20 ion detector
21 ion collecting (facing) surface
22 total pressure collector
24 filaments
26 ionization volume
28 amplifier and indicator
30 amplifier and indicator
32 primary ion beam
34 secondary electron beam
36 anode
37 ion collecting electrode
38 selected ions
44 base portion
46 mounting plate
50 Faraday collector
51 open end
53 signal lead
54 electrometer

55 mounting screw
56 hole
57 center axis
58 electron multiplier
59 beveled plate portion
60 grounded shield
61 grid shield
62 conical entrance opening
63 exit end opening
64 electron collector
65 clips
69 EM voltage sources
71 cylindrical grounded shield
78 Faraday collector
80 beam shield

What is claimed is:

1. An ion detector comprising:
a Faraday collector;
an electron multiplier oppositely disposed from said Faraday collector relative to a center axis, said Faraday collector and said electron multiplier having opposing ion collecting surfaces arranged in a direction which is parallel to the direction of travel of an incoming ion beam, said electron multiplier including means for generating an electrical potential for selectively deflecting at least portions of said incoming ion beam so as to impinge upon the ion collecting surface of either of said electron multiplier and said Faraday collector and
a grounded plate disposed in the path of said incoming ion beam beyond said opposing ion collecting surfaces of said electron multiplier and said Faraday collector for allowing uncharged particles contained in said ion beam to impinge thereupon.

2. An ion detector as claimed in claim 1, wherein said electrical potential generating means includes charging a first electrical potential on the ion collecting surface of said electron multiplier so as to deflect said incoming ion beam toward said electron multiplier in an electron multiplier mode of operation, and for charging a second oppositely charged electrical potential across the ion collecting surface of said electron multiplier so as to deflect at least portions of said ion beam onto the ion collecting surface of said Faraday collector when a Faraday detection mode is enabled.

3. An ion detector as claimed in claim 2, wherein said electron multiplier includes a hollow tubular member made from a dynode material.

4. An ion detector as claimed in claim 3, wherein said hollow tubular member includes an entrance opening and an exit opening, each of said openings being diametrically opposed relative to the direction of travel of said incoming ion beam and the ion collecting surface of said Faraday collector.

5. An ion detector as claimed in claim 2, including a bi-polar electrometer electrically connected to said electron multiplier.

6. Apparatus as claimed in claim 5, wherein said deflecting means includes a power supply electrically connected to said ion collecting surface, said ion collecting surface being made from a conductive material, said power supply being capable of applying an electric potential for drawing charged particles to said ion collecting surface.

7. Apparatus for collecting ions from an incoming particle beam containing electrically charged and uncharged particles, said apparatus comprising:
a Faraday collector having at least one ion collecting surface, said Faraday collector being arranged off axis relative to said incoming particle beam;
means for selectively deflecting charged particles contained in said particle beam to said at least one ion collecting surface; and
a grounded plate disposed in the path of said incoming particle beam to stop incoming uncharged particles when said deflecting means is enabled.

8. Apparatus as claimed in claim 7, wherein said grounded plate is made from a conductive material.

9. A method of selectively collecting ions from an incoming particle beam containing electrically charged and uncharged particles passing between an electron multiplier and a Faraday collector, each of said electron multiplier and said Faraday collector being oppositely arranged off axis relative to the incoming particle beam, said method comprising the steps of:
selectively applying a first electrical potential to an electrode of said electron multiplier suitable to deflect charged particles of said passing particle beam toward an ion collecting surface of said electron multiplier;
selectively applying a second opposite electrical potential to deflect charged particles of said passing particle beam toward an ion collecting surface of said Faraday collector; and
capturing uncharged particles of said particle beam which have passed between said electron multiplier and said Faraday collector.

10. A mass spectrometer comprising:
an ion source for generating a ion particle beam having charged and uncharged particles;
means for filtering specific charged and uncharged particles of said ion particle beam along a center axis; and
an ion detector for detecting particles passing through said filtering means, said ion detector including:
a Faraday collector;
an electron multiplier oppositely disposed from said Faraday collector relative to a center axis of said spectrometer, each of said Faraday collector and said electron multiplier being oppositely disposed relative to said center axis and having opposing ion collecting surfaces arranged in a direction which is parallel to the direction of travel of an incoming ion beam, said electron multiplier including means for generating an electrical potential for selectively deflecting at least portions of said incoming ion beam so as to impinge upon the ion collecting surface of either of said electron multiplier and said Faraday collector; and
a grounded plate disposed in the path of said incoming ion beam beyond said opposing ion collecting surfaces of said electron multiplier and said Faraday collector for allowing uncharged particles contained in said ion beam to impinge thereupon.

11. An ion detector as claimed in claim 10, wherein said electrical potential generating means includes means for charging a first electrical potential on the ion collecting surface of said electron multiplier so as to deflect the ion particle beam toward said electron multiplier in an electron multiplier mode of operation, and for charging a second oppositely charged electrical potential across the ion collecting surface of said electron multiplier so as to deflect at least portions of said ion particle beam onto the ion collecting surface of said oppositely disposed Faraday collector when a Faraday detection mode is enabled.

* * * * *